United States Patent [19]
Ashbrook

[11] Patent Number: 6,045,068
[45] Date of Patent: *Apr. 4, 2000

[54] METHOD FOR TREATING CEMENT SLURRIES

[76] Inventor: Clifford L. Ashbrook, R.R. 2, Box 439, Spicewood, Tex. 78669

[ * ] Notice: This patent issued on a continued prosecution application filed under 37 CFR 1.53(d), and is subject to the twenty year patent term provisions of 35 U.S.C. 154(a)(2).

[21] Appl. No.: 08/991,667

[22] Filed: Dec. 16, 1997

Related U.S. Application Data

[63] Continuation of application No. 08/991,667, Dec. 16, 1997, abandoned.

[51] Int. Cl.[7] .................................................. B02C 19/06
[52] U.S. Cl. .............................. 241/5; 210/738; 210/787; 366/165.5; 366/173.2
[58] Field of Search ..................................... 210/696, 702, 210/738, 764, 787, 788, 188, 512.1, 512.2; 241/5, 39; 366/165.1, 165.5, 173.2, 177.1

[56] References Cited

U.S. PATENT DOCUMENTS

| | | | |
|---|---|---|---|
| 4,261,521 | 4/1981 | Ashbrook | 241/5 |
| 4,838,701 | 6/1989 | Smith et al. | 366/136 |
| 4,957,626 | 9/1990 | Ashbrook et al. | 210/695 |
| 5,318,702 | 6/1994 | Ashbrook | 210/188 |
| 5,435,913 | 7/1995 | Ashbrook | 210/188 |
| 5,769,939 | 6/1998 | Dingsoye et al. | 106/737 |

Primary Examiner—Peter A. Hruskoci
Attorney, Agent, or Firm—Christopher L. Makay

[57] ABSTRACT

A method and apparatus for treating liquids or slurries includes first and second nozzles each having an inlet coupled to a liquid or slurry source and an outlet. A first vortex nozzle rotates a first liquid or slurry stream received from the first nozzle and delivers a first rotated liquid or slurry stream into a chamber. A second vortex nozzle rotates a second liquid or slurry stream received from the second nozzle and delivers a second rotated liquid or slurry stream into the chamber. The first and second vortex nozzles are positioned in an opposed relationship to collide the first rotated liquid or slurry stream with the second rotated liquid or slurry stream.

2 Claims, 3 Drawing Sheets

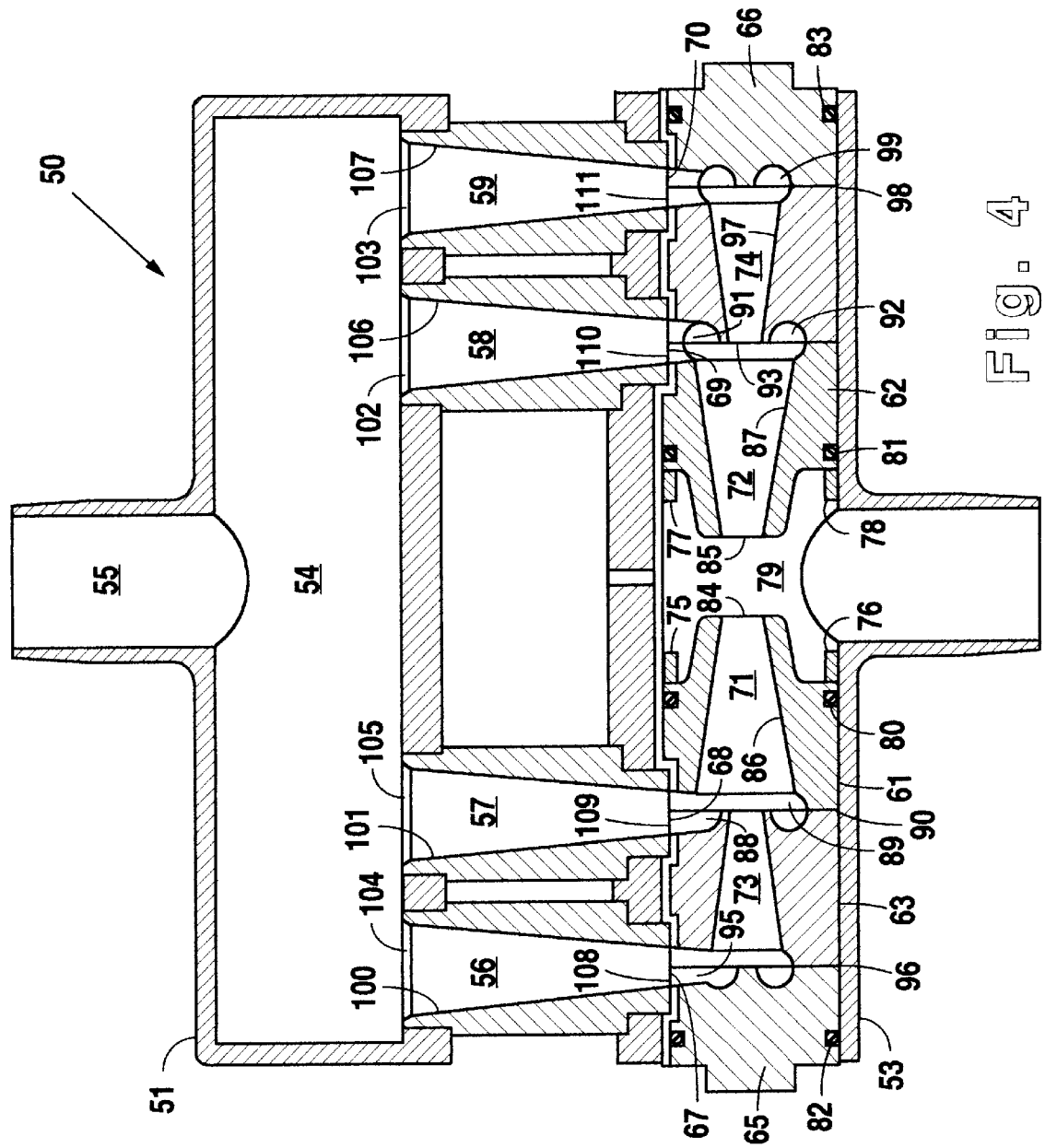

METHOD FOR TREATING CEMENT SLURRIES

CROSS-REFERENCE TO RELATED APPLICATIONS

This application is a continuation of application Ser. No. 08/991,667, filed Dec. 16, 1997, now abandoned.

BACKGROUND OF THE INVENTION

1. Field of the Invention

The present invention relates to the treatment of liquids and slurries and, more particularly, but not by way of limitation, to a method and apparatus for destroying bacteria in liquids and for reducing the particle size of insoluble materials in slurries.

2. Description of the Related Art

My U.S. Pat. No. 4,261,521 discloses a pair of vortex nozzles employed to alter the molecular array of any liquid passed therethrough to disentrain gases and agglomerate solids. The vortex nozzles are positioned in opposed relationship and impart a rotation to a liquid passing therethrough. The vortex nozzles expel the rotated liquid streams at a high velocity to collide the two streams at approximately halfway between the vortex nozzle outlets. The collision between the rotated streams creates compression waves throughout the liquid that, coupled with the high velocity of the rotated streams, imparts a large amount of kinetic energy to the molecules of the liquid, gases entrained in the liquid, and the minerals dissolved in the liquid. In addition, the compression waves produce a shearing action that aids in tearing apart the molecular structure of the liquid. Thus, the compression waves and resulting increase in kinetic energy facilitates the breaking of the bonds between the individual liquid molecules, the liquid molecules and the entrained gases, and the liquid molecules and the dissolved minerals.

My U.S. Pat. No. 5,318,702 attempts to improve over my U.S. Pat. No. 4,261,521 by providing each vortex nozzle with at least one pair of slots that extend through the walls of the vortex nozzles. Each individual slot communicates with a chamber about the vortex nozzles that, in turn, communicates with the exit stream of the vortex nozzles through a conduit. The addition of the slots to the vortex nozzles enhances the release of entrained gases and the agglomeration of minerals by removing a fraction of the liquid from the rotating streams as they circulate about the vortex nozzles prior to expulsion. In removing a small portion of the liquid from the two streams rotating about the vortex nozzles, the slots bleed-off liquid molecules as well as many of the free electrons and elemental ions created through the collision of the two counter-rotating streams. The slots in removing the liquid molecules, free electrons, and ions from the two rotating streams enhance the ability of the compressional waves to further separate the liquid into its constituent parts because their removal weakens the bonds of the molecules remaining in the rotating streams.

While both my U.S. Pat. Nos. 4,261,521 and 5,318,702 are effective in releasing entrained gases and agglomerating minerals in suspension, it has been determined that increasing the velocity of the rotated streams will increase the effectiveness of the vortex nozzles in releasing entrained cases and agglomerating minerals. In addition, an increase in the velocity of the rotated streams facilitates the destruction of bacteria in liquids. The increased velocity of the rotated streams enlarges the compression waves to a point where they rapidly expand and contract the bacteria. That rapid expansion and contraction ruptures the cell structure of the bacteria, thereby destroying them.

My U.S. Pat. No. 5,435,913 improves over my U.S. Pat. Nos. 4,261,521 and 5,318,702 by providing a vortex nozzle unit that increases the velocity of the rotated streams. The vortex nozzle unit consists of a first pair of vortex nozzles including a first vortex nozzle cascaded with a second and a second pair of vortex nozzles including a third vortex nozzle cascaded with a fourth. Each of the four vortex nozzles receives liquid through an inlet and imparts a rotation to the liquid as it passes therethrough. The rotated liquid streams of the first and second vortex nozzles combine in the second vortex nozzle to create a single high velocity liquid stream. Similarly, the rotated liquid streams of the third and fourth vortex nozzles combine in the fourth vortex nozzle to create a single high velocity liquid stream. The first and second cascaded pairs of vortex nozzles are positioned in opposed relationship so that their high velocity liquid streams collide at approximately the mid-point of a chamber housing the cascaded pairs of vortex nozzles. The collision of the liquid streams at an increased velocity creates increased amplitude compression waves throughout the liquid that more effectively disentrains gases and agglomerates solids and, further, destroys bacteria within the liquid. Although the cascaded pairs of vortex nozzles destroy bacteria within liquids, it has been determined that an even further increase in the velocity of the liquid streams and corresponding increase in the amplitude of the compression waves is necessary to effectively eliminate bacteria from liquids.

SUMMARY OF THE INVENTION

In accordance with the present invention, an apparatus for treating liquids and slurries includes first and second nozzles each having an inlet coupled to a liquid or slurry source and an outlet. A first vortex nozzle rotates a first liquid or slurry stream received from the first nozzle and delivers a first rotating liquid or slurry stream into a chamber. A second vortex nozzle rotates a second liquid or slurry stream received from the second nozzle and delivers a second rotating liquid or slurry stream into the chamber. The first and second vortex nozzles are positioned in an opposed relationship to collide the first rotated liquid or slurry stream with the second rotated liquid or slurry stream.

The apparatus for treating liquids and slurries may further include third and fourth nozzles each having an inlet coupled to a liquid or slurry source and an outlet. A third vortex nozzle rotates a third liquid or slurry stream received from the third nozzle and delivers a third rotating liquid or slurry stream into the first vortex nozzle. A fourth vortex nozzle rotates a fourth liquid or slurry stream received from the fourth nozzle and delivers a fourth rotated liquid or slurry stream into the second vortex nozzle.

A method for treating slurries to reduce the particle size of insoluble material therein includes delivering a first slurry stream to a first vortex nozzle, rotating the first slurry stream utilizing the first vortex nozzle to produce a first rotated slurry stream, and delivering the first rotated slurry stream into a chamber. The method includes delivering a second slurry stream to a second vortex nozzle positioned in opposed relationship to the first vortex nozzle, rotating the second slurry stream utilizing the first vortex nozzle to produce a second rotated slurry stream, and delivering the second rotated slurry stream into the chamber to collide the second rotated slurry stream with the first rotated slurry stream.

It is, therefore, an object of the present invention to provide a vortex nozzle unit that imparts sufficient velocity to a liquid flowing therethrough such that bacteria within the liquid are destroyed.

It is another object of the present invention to provide a vortex nozzle unit that imparts sufficient velocity to a slurry flowing therethrough such that the particle size of insoluble materials within the slurry is reduced.

Still other objects, features, and advantages of the present invention will become evident to those skilled in the art in light of the following.

BRIEF DESCRIPTION OF THE DRAWINGS

FIG. 4 is a front view taken in cross-section along lines 4, 4 of FIG. 3 depicting the second embodiment of the vortex nozzle unit.

DETAILED DESCRIPTION OF THE PREFERRED EMBODIMENTS

Figure 1:
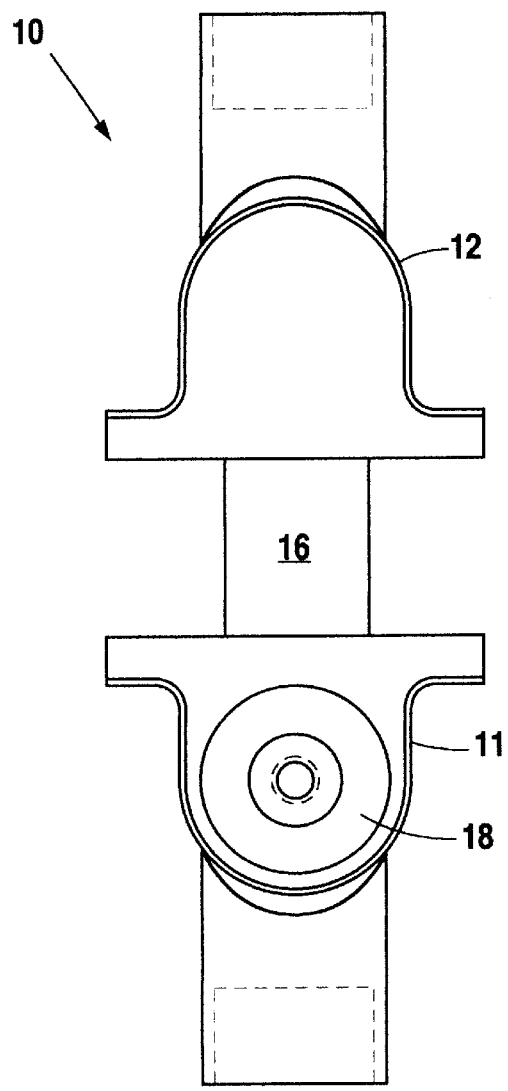
FIG. 1 is a side elevation view depicting a first embodiment of a vortex nozzle unit.
Figure 3:
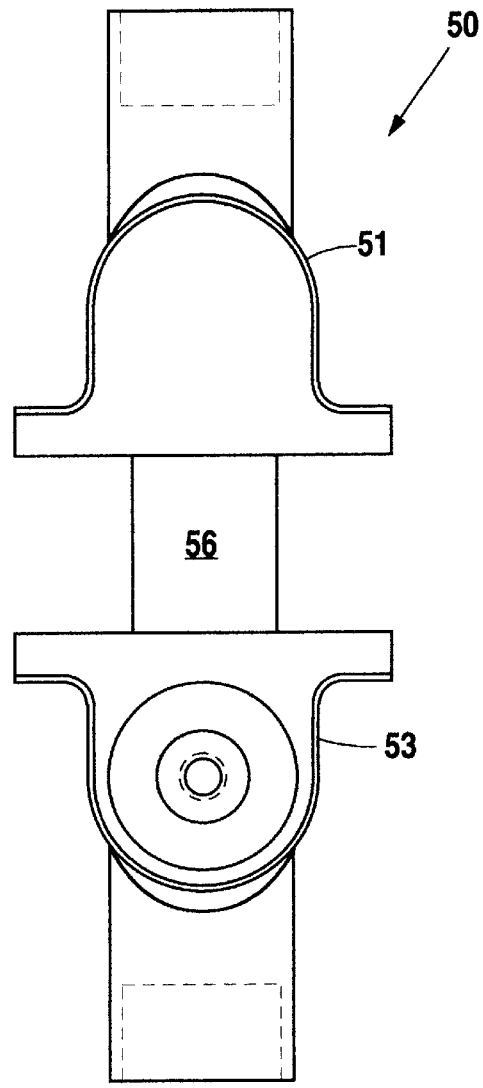
FIG. 3 is a side elevation view depicting a second embodiment of the vortex nozzle unit.
Figure 2:
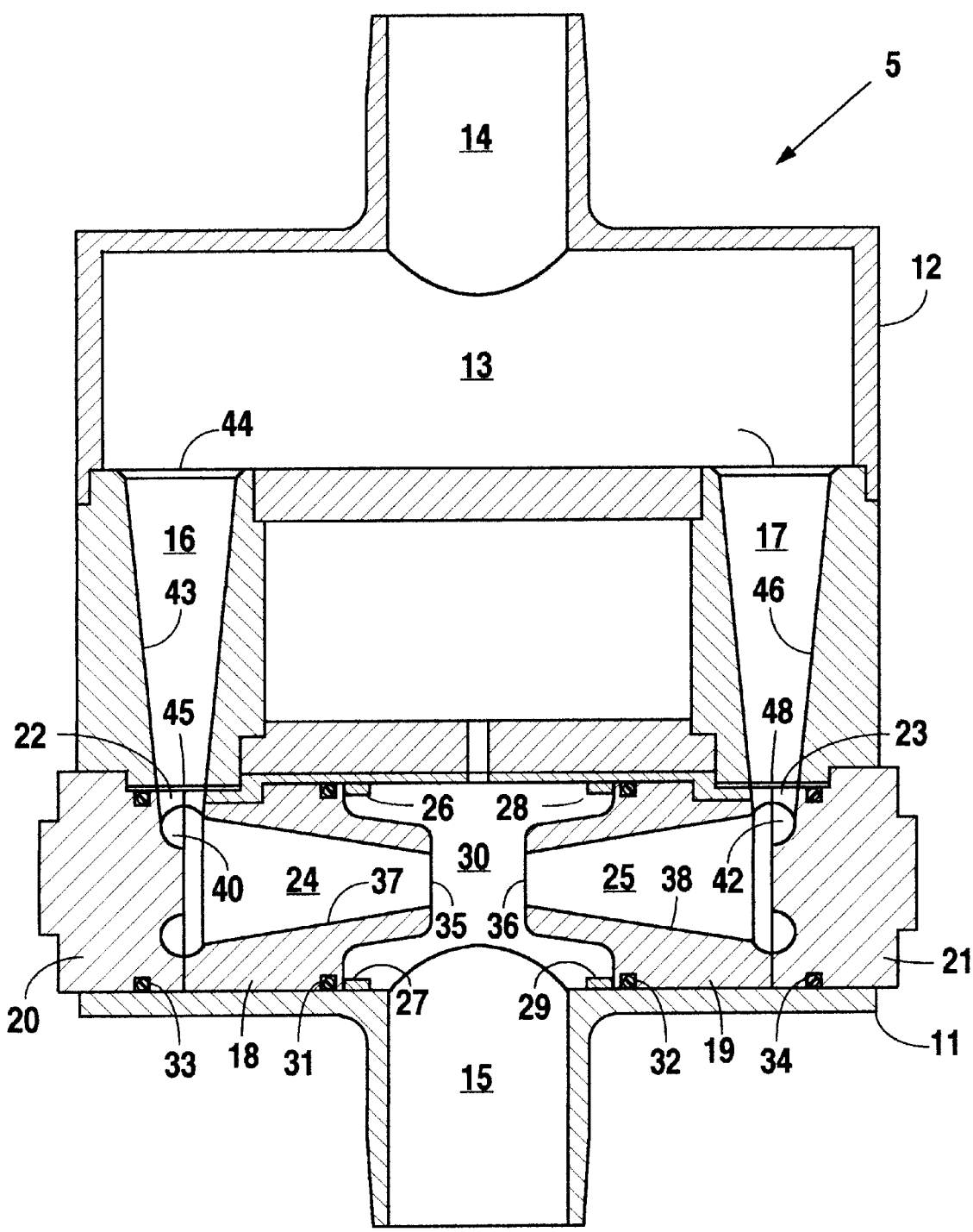
FIG. 2 is a front view taken in cross-section along lines 2, 2 of FIG. 1 depicting the first embodiment of the vortex nozzle unit.

As illustrated in FIGS. 1 and 2, a vortex nozzle unit 10 includes body portions 11 and 12 and nozzles 16 and 17 which are formed using any standard machining or molding process. The nozzles 16 and 17 connect between the body portions 11 and 12 using any well known means such as press fitting. The body portion 12 defines a chamber 13 and includes an inlet 14 that attaches to any suitable liquid source such as a well, public water source, or vat/drum containing a liquid. A pump (not shown) delivers liquid under pressure from the liquid source to the inlet 14. The nozzles 16 and 17 deliver the liquid to the body portion 11. The body portion 11 defines a chamber and includes outlet 15 that attaches to any suitable reservoir or liquid delivery means such as a faucet, shower, or hose. For the purposes of disclosure and to aid in the understanding of the invention, the operation of the vortex nozzle unit 10 in eliminating bacteria from water will be described even though the vortex nozzle unit 10 disentrains gases, agglomerates solids, and destroys bacteria for any liquid.

The body portion 11 houses within its chamber vortex nozzle assembly blocks 18–21. Additionally, the body portion 11 includes inlets 22 and 23 that communicate with the chamber 13 of the body portion 12 via the nozzles 16 and 17, respectively. The structure of vortex nozzle assembly blocks 18–21 is similar to those described in my U.S. Pat. Nos. 4,261,521; 4,957,626; 5,318,702; and 5,435,913; the disclosures of which are herein incorporated by reference. Each of the vortex nozzle assembly blocks 18–21 is shaped using any standard machining or molding process to define a portion of vortex nozzles 24 and 25.

The vortex nozzle assembly blocks 18 and 19 are inserted within the chamber defined by the body portion 11 until their inner edges contact protrusions 26–29. The protrusions 26–29 prevent the vortex nozzle assembly blocks 18 and 19 from being inserted completely within the center of the chamber defined by the body portion 11. The vortex nozzle assembly blocks 18 and 19 reside within the chamber defined by the body portion 11 such that they define a chamber 30 that communicates with the outlet 15. The vortex nozzle assembly blocks 18 and 19 include O-rings 31 and 32, respectively, that form a liquid seal between the vortex nozzle assembly blocks 18 and 19 and the inner surface of the body portion 11.

After the insertion of the vortex nozzle assembly blocks 18 and 19 to the position shown in FIG. 2, the vortex nozzle assembly blocks 20 and 21 are inserted until they abut the rear portions of the vortex nozzle assembly blocks 18 and 19, respectively. The vortex nozzle assembly blocks 20 and 21 include O-rings 33 and 34, respectively, that form a fluid seal between the vortex nozzle assembly blocks 20 and 21 and the inner surface of the body portion 11.

With the vortex nozzle assembly blocks 18–21 positioned and secured within the chamber defined by the body portion 11, the vortex nozzle assembly blocks 18–21 define the vortex nozzles 24 and 25. The vortex nozzles 24 and 25 are positioned in opposed relation so that a stream of water exiting their outlets 35 and 36, respectively, will collide approximately at the mid-point of the chamber 30. The vortex nozzle assembly blocks 18 and 19 define frustro-conical inner surfaces 37 and 38 of the vortex nozzles 24 and 25, respectively. The abutment between the vortex nozzle assembly blocks 18 and 20 defines a circular portion 40 that communicates with the inlet 22. Likewise, the abutment between the vortex nozzle assembly blocks 19 and 21 defines a circular portion 42 that communicates with the inlet 23.

Thus, in operation, the pump (not shown) pumps water into the chamber 13 via the inlet 14. The water enters the chamber 13 at a velocity dependent upon the size of the pump. The water flows from the chamber 13 into the nozzles 16 and 17 of the body portion 10. The nozzle 16 includes a frustro-conical inner surface 43 that tapers inwardly from an inlet 44 to an outlet 45. Similarly, the nozzle 17 includes a frustro-conical inner surface 46 that tapers inwardly from an inlet 47 to an outlet 48. The frustro-conical inward taperings of the nozzles 16 and 17 result in an increase in pressure of the water stream flowing through the nozzles 16 and 17. Consequently, the velocity of the water stream exiting the nozzles 16 and 17 is increased due to the increase in the pressure of the water stream flowing through the nozzles 16 and 17. The nozzles 16 and 17, therefore, increase the velocity of the water stream entering the vortex nozzles 24 and 25 without the necessity of increasing the size of the pump. In this preferred embodiment, one of ordinary skill in the art will recognize that, since the purpose of the nozzles 16 and 17 is to increase the velocity of the water streams entering the vortex nozzles 24 and 25, the nozzles 16 and 17 may be replaced with vortex nozzles that would further increase the velocity of the water streams entering the vortex nozzles 24 and 25 over the nozzles 16 and 17.

The water streams flow from the nozzles 16 and 17 into the inlets 22 and 23, respectively, which deliver the water streams to respective circular portions 40 and 42 of the vortex nozzles 24 and 25. The circular portions 40 and 42 impart a circular rotation to the water streams and deliver the circularly rotating water streams into the frustro-conical inner surfaces 37 and 38, respectively. The frustro-conical inner surfaces 37 and 38 maintain the circular rotation in their respective water streams and deliver the circularly rotated water streams to respective outlets 35 and 36 from the vortex nozzles 24 and 25. Although the water streams rotate circularly within the vortex nozzles 24 and 25, they actually exit the vortex nozzles 24 and 25 from a respective outlet 35 and 36 linearly.

The circularly rotated water streams exit the vortex nozzles 24 and 25 at outlets 35 and 36, respectively, and collide at approximately the mid-point of the chamber 30. As the exiting water streams collide, compression waves are created within the rotated water streams. The compression waves within the rotated water streams rapidly expand and contract bacteria within the water to a point where the cell structures of the bacteria rupture, resulting in the destruction of the bacteria.

As illustrated in FIGS. 3 and 4, a vortex nozzle unit 50 includes body portions 51 and 53 and nozzles 56–59 which are formed using any standard machining or molding process. The nozzles 56–59 are connected between body portions 51 ant 53 using any well known means such as press fitting. The body portion 51 defines a chamber 54 and includes an inlet 55 that attaches to any suitable liquid source such as a well, public water source, or vat/drum containing a liquid. A pump (not shown) delivers liquid under pressure from the liquid source to the inlet 55. The nozzles 56–59 deliver the liquid to the body portion 53. The body portion 53 defines a chamber and includes an outlet 60 that attaches to any suitable reservoir or liquid delivery means such as a faucet, shower, or hose. For the purposes of disclosure and to aid in the understanding of the invention, the operation of the vortex nozzle unit 50 in eliminating bacteria from water will be described even though the vortex nozzle unit 50 disentrains gases, agglomerates solids, and destroys bacteria for any liquid.

The body portion 53 houses within its chamber vortex nozzle assembly blocks 61–66. Additionally, the body portion 53 includes inlets 67–70 that communicate with a respective nozzle 56–59 of the body portion 52. The structure of vortex nozzle assembly blocks 61–66 is similar to those described in my U.S. Pat. Nos. 4,261,521; 4,957,626; 5,318,702; and 5,435,913; the disclosures of which are herein incorporated by reference. Each of the vortex nozzle assembly blocks 61–66 is shaped using any standard machining or molding process to define a portion of vortex nozzles 71–74.

The vortex nozzle assembly blocks 61 and 62 are inserted within the chamber defined by the body portion 53 until their inner edges contact protrusions 75–78. The protrusions 75–78 prevent the vortex nozzle assembly blocks 61 and 62 from being inserted completely within the center of the chamber defined by the body portion 53. The vortex nozzle assembly blocks 61 and 62 reside within the chamber defined by the body portion 53 such that they define a chamber 79 that communicates with the outlet 60. The vortex nozzle assembly blocks 18 and 19 include O-rings 80 and 81, respectively, that form a liquid seal between the vortex nozzle assembly blocks 61 and 62 and the inner surface of the body portion 53.

After the insertion of the vortex nozzle assembly blocks 61 and 62 to the position shown in FIG. 2, the vortex nozzle assembly blocks 63 and 64 are inserted until they abut the rear portions of the vortex nozzle assembly blocks 61 and 62, respectively. Finally, the vortex nozzle assembly blocks 65 and 66 are inserted until they abut the rear portions of the vortex nozzle assembly blocks 63 and 64, respectively. The vortex nozzle assembly blocks 65 and 66 include O-rings 82 and 83, respectively, that form a liquid seal between the vortex nozzle assembly blocks 65 and 66 and the inner surface of the body portion 53.

In their position within the chamber defined by the body portion 53, the vortex nozzle assembly blocks 61–66 define the vortex nozzles 71–74. The vortex nozzles 71 and 72 are positioned in opposed relation so that a stream of water exiting their outlets 84 and 85, respectively, will collide approximately at the mid-point of the chamber 79. The vortex nozzle assembly blocks 61 and 62 define frustro-conical inner surfaces 86 and 87 of the vortex nozzles 71 and 72, respectively. The abutment of the vortex nozzle assembly block 63 with the vortex nozzle assembly block 61 defines a channel 88 that communicates with the inlet 68 and a circular portion 89. Additionally, the outlet 90 from the vortex nozzle 73 communicates with the circular portion 89 of the vortex nozzle 71. Similarly, the vortex nozzle blocks 62 and 64 define a channel 91 that communicates with the inlet 69 and a circular portion 92, while the outlet 93 from the vortex nozzle 74 communicates with the circular portion 92 of the vortex nozzle 72.

The vortex nozzle assembly block 63 defines a frustro-conical inner surface 94, while the abutment between the vortex nozzle assembly blocks 63 and 65 defines a channel 95 that communicates with the inlet 67 and a circular portion 96. The vortex nozzle assembly block 64 defines a frustro-conical inner surface 97 and the abutment between the vortex nozzle assembly blocks 64 and 66 defines a channel 98 that communicates with the inlet 70 and a circular portion 99.

Thus, in operation, the pump (not shown) pumps water into the chamber 54 via the inlet 55. The water enters the chamber 54 at a velocity dependent upon the size of the pump. The water flows from the chamber 54 into the nozzles 56–59 of the body portion 52. The nozzles 56–59 each include a respective frustro-conical inner surface 100–103 that tapers inwardly from a respective inlet 104–107 to a respective outlet 108–111. The frustro-conical inward taperings of the nozzles 56–59 result in an increase in pressure of the water stream flowing through the nozzles 56–59. Consequently, the velocity of the water streams exiting the nozzles 56–59 is increased due to the increase in the pressure of the water streams flowing through the nozzles 56–59. The nozzles 56–59, therefore, increase the velocity of the water stream entering the vortex nozzles 71–74 without the necessity of increasing the size of the pump. In this preferred embodiment, one of ordinary skill in the art will recognize that, since the purpose of the nozzles 56–59 is to increase the velocity of the water streams entering the vortex nozzles 71–74, the nozzles 56–59 may he replaced with vortex nozzles that would further increase the velocity of the water streams entering the vortex nozzles 71–74 over the nozzles 56–59.

The water streams flow from the nozzles 56–59 into a respective channel 88, 91, 95, and 98 via the inlets 67–70. The channels 88, 91, 95, and 98 deliver the water streams to respective circular portions 89, 92, 96, and 99 of the vortex nozzles 71–74. The circular portions 89, 92, 96, and 99 impart a circular rotation to the water streams and deliver the circularly rotated water streams into the frustro-conical inner surfaces 86, 87, 94 and 97, respectively. The frustro-conical inner surfaces 86, 87, 94, and 97 maintain the circular rotation in their respective water streams and deliver the circularly rotated water streams to the respective outlets 84, 85, 90, and 93 from the vortex nozzles 71–74. Although the water streams rotate circularly within the vortex nozzles 71–74, they actually exit the vortex nozzles 71–74 from a respective outlet 84, 85, 90, and 93 linearly.

Due to the cascaded configuration of the vortex nozzles 73 and 74, the water streams exiting their outlets 90 and 93 enter the vortex nozzles 71 and 72, respectively. Those circularly rotated water streams combine with the circularly rotated water streams within the vortex nozzles 71 and 72 to increase the velocity of the circularly rotated water streams therein. Additionally, the circularly rotated water streams exiting vortex nozzles 73 and 74 contact a respective circularly rotated water stream within the vortex nozzles 71 and 72 such that they create compression waves therein.

The combined circularly rotated water streams from the vortex nozzles 71 and 73 and the combined circularly rotated water streams from the vortex nozzles 72 and 74 exit the vortex nozzles 71 and 72 at the outlets 84 and 85, respectively, and collide at approximately the mid-point of the chamber 79. As the water streams exiting the vortex nozzles 71 and 72 collide, additional compression waves are created that combine with the earlier compression waves to create compression waves having amplitudes greater than the original compression waves. The increased amplitude compression waves within the rotated water streams rapidly expand and contract bacteria within the water to a point where the cell structures of the bacteria rupture, resulting in the destruction of the bacteria.

In a method of reducing the particle size of insoluble material in a slurry, the minimum apparatus required is a pair of opposed vortex nozzles that communicate directly with a slurry source, nevertheless, one of ordinary skill in the art will recognize that the vortex nozzle units 10 and 50 of the preferred embodiments will produce better results. Example slurries would include cement mixed with an appropriate portion of water, which is then treated to reduce the size of the cement particles, thereby forming microcement.

The method involving the vortex nozzle unit 10 includes pumping a slurry into the chamber 13 via the inlet 14. The slurry enters the chamber 13 at a velocity dependent upon the size of the pump. The slurry flows from the chamber 13 into the nozzles 16 and 17 of the body portion 10. The nozzles 16 and 17 increase the pressure of the slurry streams flowing therethrough before delivering the slurry streams to a respective vortex nozzles 24 and 25. One of ordinary skill in the art will recognize that, since the purpose of the nozzles 16 and 17 is to increase the velocity of the slurry streams entering the vortex nozzles 24 and 25, the nozzles 16 and 17 may be replaced with vortex nozzles that would further increase the velocity of the slurry streams entering the vortex nozzles 24 and 25 over the nozzles 16 and 17.

The slurry streams flow from the nozzles 16 and 17 into the inlets 22 and 23, respectively, which deliver the slurry streams to respective circular portions 40 and 42 of the vortex nozzles 24 and 25. The circular portions 40 and 42 impart a circular rotation to the slurry streams and deliver the circularly rotating slurry streams into the frustro-conical inner surfaces 37 and 38, respectively. The frustro-conical inner surfaces 37 and 38 maintain the circular rotation in their respective slurry streams and deliver the circularly rotated slurry streams to respective outlets 35 and 36 from the vortex nozzles 24 and 25. Although the slurry streams rotate circularly within the vortex nozzles 24 and 25, they actually exit the vortex nozzles 24 and 25 from a respective outlet 35 and 36 linearly. The circularly rotated slurry streams exit the vortex nozzles 24 and 25 at outlets 35 and 36, respectively, and collide at approximately the mid-point of the chamber 30 to reduce the particle size of the insoluble material in the slurry.

The method involving the vortex nozzle unit 50 includes pumping a slurry into the chamber 54 via the inlet 55. The slurry enters the chamber 54 at a velocity dependent upon the size of the pump. The slurry flows from the chamber 54 into the nozzles 56–59 of the body portion 52. The nozzles 56–59 increase the pressure of the slurry streams flowing therethrough before delivering the slurry streams to respective vortex nozzles 71–74. One of ordinary skill in the art will recognize that, since the purpose of the nozzles 56–59 is to increase the velocity of the slurry streams entering the vortex nozzles 71–74, the nozzles 56–59 may be replaced with vortex nozzles that would further increase the velocity of the slurry streams entering the vortex nozzles 71–74 over the nozzles 56–59.

The slurry streams flow from the nozzles 56–59 into a respective channel 88, 91, 95, and 98 via the inlets 67–70. The channels 88, 91, 95, and 98 deliver the slurry streams to respective circular portions 89, 92, 96, and 99 of the vortex nozzles 71–74. The circular portions 89, 92, 96, and 99 impart a circular rotation to the slurry streams and deliver the circularly rotated slurry streams into the frustro-conical inner surfaces 86, 87, 94 and 97, respectively. The frustro-conical inner surfaces 86, 87, 94, and 97 maintain the circular rotation in their respective slurry streams and deliver the circularly rotated slurry streams to the respective outlets 84, 85, 90, and 93 from the vortex nozzles 71–74. Although the slurry streams rotate circularly within the vortex nozzles 71–74, they actually exit the vortex nozzles 71–74 from a respective outlet 84, 85, 90, and 93 linearly.

Due to the cascaded configuration of the vortex nozzles 73 and 74, the slurry streams exiting their outlets 90 and 93 enter the vortex nozzles 71 and 72, respectively. Those circularly rotated slurry streams combine with the circularly rotated slurry streams within the vortex nozzles 71 and 72 to increase the velocity of the circularly rotated slurry streams therein. Additionally, the circularly rotated slurry streams exiting vortex nozzles 73 and 74 contact a respective circularly rotated slurry stream within the vortex nozzles 71 and 72 such that they reduce the particle size of the insoluble material in the slurry. The combined circularly rotated slurry streams from the vortex nozzles 71 and 73 and the combined circularly rotated slurry streams from the vortex nozzles 72 and 74 exit the vortex nozzles 71 and 72 at the outlets 84 and 85, respectively, and collide at approximately the mid-point of the chamber 79 to further reduce the particle size of the insoluble material in the slurry.

Although the present invention has been described in terms of the foregoing preferred embodiments, such description has been for exemplary purposes only, and, as will be apparent to those of ordinary skill in the art, many alternatives, equivalents, and variations of varying degrees will fall within the scope of the present invention, that scope, accordingly, is not to be limited in any respect by the foregoing description, rather, it is defined only by the claims that follow.

I claim:

1. A method for treating cement slurries to reduce the particle size of insoluble material therein, thereby producing microcement, comprising the steps of:

delivering a first cement slurry stream to a first vortex nozzle;

rotating the first cement slurry stream utilizing the first vortex nozzle to produce a first rotated cement slurry stream;

delivering the first rotated cement slurry stream into a chamber;

delivering a second cement slurry stream to a second vortex nozzle positioned in opposed relationship to the first vortex nozzle;

rotating the second cement slurry stream utilizing the first vortex nozzle to produce a second rotated cement slurry stream; and delivering the second rotated cement slurry stream into the chamber to collide the second rotated cement slurry stream with the first rotated cement slurry stream to reduce the particle size of insoluble material therein, thereby producing microcement.

2. A method for treating cement slurries to reduce the particle size of insoluble material therein, thereby producing microcement, comprising the steps of:

delivering a first cement slurry stream to a first vortex nozzle;

rotating the first cement slurry stream utilizing the first vortex nozzle to produce a first rotated cement slurry stream;

delivering a second cement slurry stream to a second vortex nozzle positioned in opposed relationship to the first vortex nozzle;

rotating the second cement slurry stream utilizing the second vortex nozzle to produce a second cement rotated slurry stream;

delivering a third cement slurry stream to a third vortex nozzle cascaded with the first vortex nozzle;

rotating the third cement slurry stream utilizing the third vortex nozzle to produce a third rotated cement slurry stream;

delivering the third rotated cement slurry stream into the first vortex nozzle to produce a combined first rotated cement slurry stream;

delivering a fourth cement slurry stream to a fourth vortex nozzle cascaded with the second vortex nozzle;

rotating the fourth cement slurry stream utilizing the fourth vortex nozzle to produce a fourth rotated cement slurry stream;

delivering the fourth rotated cement slurry stream into the second vortex nozzle to produce a combined second rotated cement slurry stream; and colliding in a chamber the combined first rotated cement slurry stream with the combined second rotated cement slurry stream to reduce the particle size of insoluble material therein, thereby producing microcement.

* * * * *